UNITED STATES PATENT OFFICE.

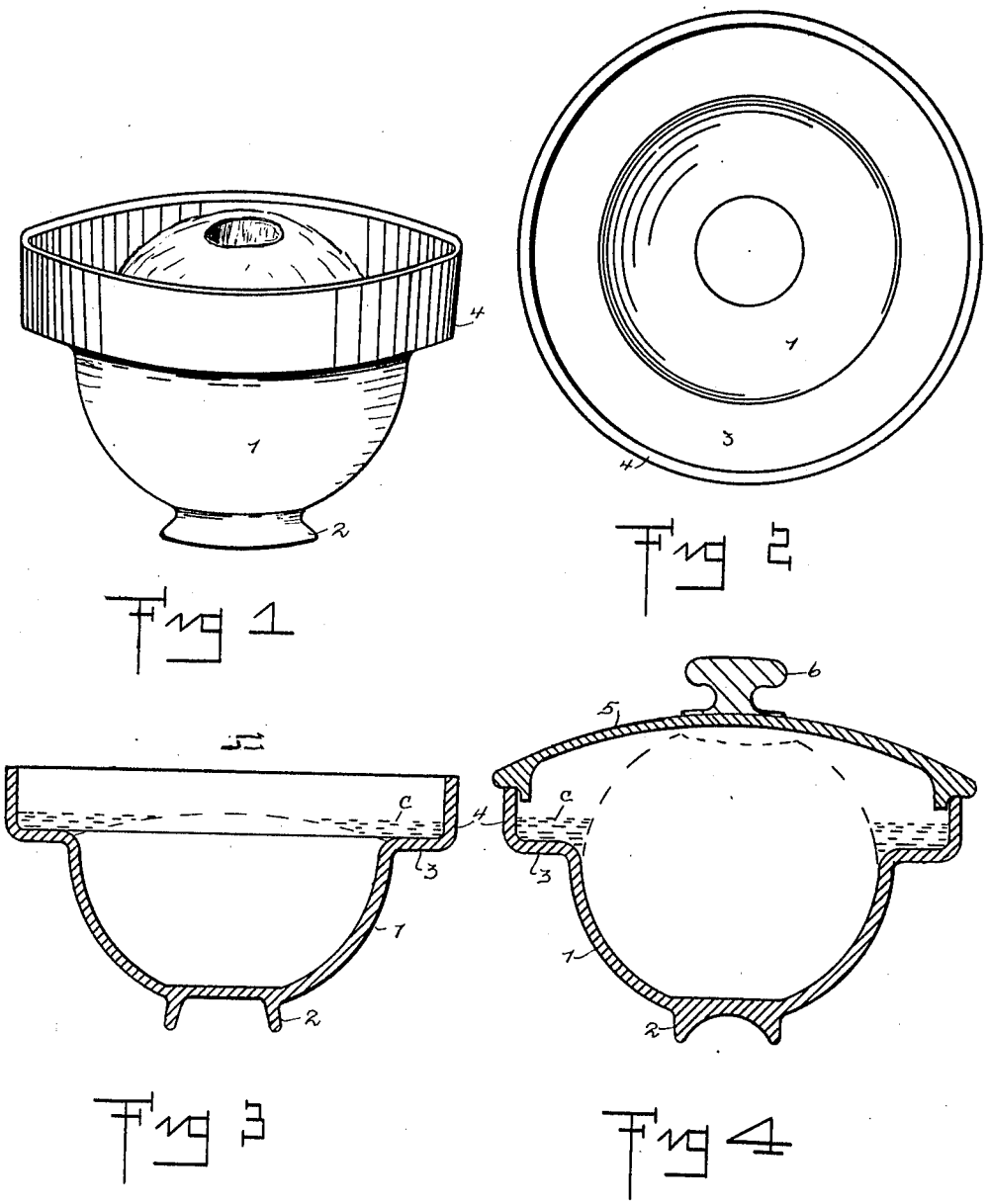

ROBERT C. LAFFERTY, OF NEW YORK, N. Y.

COOKING AND SERVING DEVICE FOR FRUITS.

1,313,947.  Specification of Letters Patent.  Patented Aug. 26, 1919.

Application filed March 24, 1916. Serial No. 86,343.

*To all whom it may concern:*

Be it known that I, ROBERT CHARLES LAFFERTY, a citizen of the United States, and resident of the borough of Manhattan, city, county, and State of New York, have invented certain new and useful Improvements in Cooking and Serving Devices for Fruits, of which the following is a specification.

While the device, the subject of this invention, may be broadly termed a baking dish because of peculiarities in its design, shape and size, it may be specifically termed "an apple or fruit baker."

It is my intention that the cup or bowl portion may be so constructed that it will conform to the shape and closely approximate the size of a well rounded apple, orange or similar shaped fruit. The reasons for this and the shape and advantages to be derived therefrom will be fully set forth as the specification progresses.

The following is what I consider a good means of carrying out this invention and the accompanying drawings should be referred to in connection with the specification.

In the drawings—

Figure 1. is a perspective view of my device in operative condition.

Fig. 2. is a plan view.

Fig. 3. a central section.

Fig. 4 is a section through the device having a cover placed thereon.

As shown in the drawings this device has a shape peculiar to itself. The lower portion 1, is formed as a semisphere. At the bottom of this member 1, is a downwardly projected flange 2, which may be attached to the bottom or formed integral therewith and which should extend downward sufficient to prevent the bottom of the portion 1, coming in direct contact with a heated surface or with any other surface upon which it is placed.

Surrounding the top open edge of the member 1, is a flange 3, which terminates in an upward projection 4. The flange 3, should be of a liberal width sufficient to accomplish the purposes assigned to it and the projection 4, which is a rim should be of a height sufficient to allow it to serve with the flange 3, to retain within the receptacle all of the juice that may be produced during the course of baking.

The receptacle may be formed of any suitable material such as glass, earthen-ware or metal and in the complete construction, I will provide a cover as shown at 5, having a handle or knob 6, which cover will serve to retain the vapor which may arise from the fruit during the baking thereof and assure that the fruit will always be retained moist. The cover should be of a size sufficient to allow it to be received and retained by the upwardly extending projection 4.

In the use of my device an apple or other fruit properly prepared may be placed within the member 1, and if an apple or orange is so placed it will probably project upward to the extent indicated at Fig. 1. The spice or sweetening is placed within the cored out portion of the apple and the cover arranged in position, baking may then be accomplished and after the baking is completed, the cover may be removed a portion of cream placed upon the flange 3, and between the projection 4 and the fruit, at which time the fruit will be ready to be served.

The advantages of this invention are quite evident. The device retains the fruit in a quite perfect condition during baking, prevents the loss of fruit juices by distillation or by flowing away as usually occurs when a flat open receptacle is employed.

A further advantage is that fruit so prepared may be served with all of the accompanying juices and in the container in which they are prepared, thus obviating the necessity of the handling that is customary when other means are utilized in the preparation.

It is quite obvious that the cover may be omitted and that the depth or width of the projection 4, and the width of the flange 3, may be changed at will, but I preferred the whole as shown and described.

While I have described this device as a serving means for fruits, it will of course be quite evident that the device may be employed with equal efficiency as a means for preparing and serving puddings, custards and the like and when so used only a sufficient quantity should be placed in the device to fill it to the dotted line indicated at C, the projecting portion being left free for the reception and retention of cream, sauces or other material added in serving.

Having described my invention what I claim and desire to secure by Letters Patent is A cooking and serving device for fruits, having a fruit conforming receiving member adapted to hold the fruit in its original form while being cooked and served; an outwardly extending projection provided with an upwardly projecting member so arranged as to form a separate sauce or liquid containing compartment around the fruit for the purposes set forth, and a cover therefor provided, having a member overlapping said upwardly projecting member of the cooking device, and a flange attached to engage with the inner side of said upwardly projecting member of the cooking device.

Signed at the city, county and State of New York, this 13th day of March, 1916.

ROBT. C. LAFFERTY.